US008644279B2

(12) United States Patent
Lindoff

(10) Patent No.: US 8,644,279 B2
(45) Date of Patent: Feb. 4, 2014

(54) SR/RACH TRANSMISSION STRATEGY FOR HALF-DUPLEX UES IN LTE

(75) Inventor: Bengt Lindoff, Bjärred (SE)

(73) Assignee: Telefonaktiebolaget L M Ericsson (publ.), Stockholm (SE)

( * ) Notice: Subject to any disclaimer, the term of this patent is extended or adjusted under 35 U.S.C. 154(b) by 334 days.

(21) Appl. No.: 12/970,892

(22) Filed: Dec. 16, 2010

(65) Prior Publication Data
US 2012/0155436 A1    Jun. 21, 2012

(51) Int. Cl.
*H04W 4/00* (2009.01)
(52) U.S. Cl.
USPC .......................................... 370/338; 370/445
(58) Field of Classification Search
None
See application file for complete search history.

(56) References Cited

U.S. PATENT DOCUMENTS 7,394,798 B2 * 7/2008 Naghian ........................ 370/338
7,424,029 B1 * 9/2008 Shum ............................ 370/445

OTHER PUBLICATIONS

International Search Report, PCT/EP20111070450, Mar. 8, 2012.
Nortel: "Analysis of HD-FDD error and TX/RX conflict scenarios", 3GPP TSG RAN WG2 #61bis, R2-081845, Sections 1 and 2.5.
Ericsson: "Impacts of Half-Duplex FDD UE Operation on RAN2 Specifications", TSG-RAN WG2 Meeting #62, R2-082150 (updated R2-081453), Sections 21 to 2.4.
ETSI MCC: "Report of 3GPP TSG RAN WG2 Meeting #62", R2-083767, p. 76.

* cited by examiner

*Primary Examiner* — Alex Skripnikov
(74) *Attorney, Agent, or Firm* — Potomac Patent Group PLLC

(57) ABSTRACT

A method of avoiding collision between uplink and downlink data of a user equipment includes verifying existence of data in an uplink buffer, determining a time instant for transmission of the uplink data, determining a likelihood for reception of downlink data at the determined time instant and selectively transmitting the uplink data based on the likelihood of reception wherein the user equipment is a half duplex (HD) equipment.

19 Claims, 4 Drawing Sheets

SR/RACH TRANSMISSION STRATEGY FOR HALF-DUPLEX UES IN LTE

TECHNICAL FIELD

This invention relates to user equipment terminals and more particularly, to methods for increasing the throughput of these terminals.

BACKGROUND

Newer (and future) mobile terminals have to support a large number of frequency bands and cellular system standards. A solution for a terminal (also referred to as a user equipment or UE) that is efficient both from a cost and a size point of view and one which supports a number of frequency bands is to permit only half duplex operation in some of the bands.

Half duplex operation provides either transmission or reception at an instant in time—that is, it does not permit simultaneous transmission and reception. By utilizing half duplex operation, the need for a large duplex filter can be obviated. This results in a reduction in the cost associated with the large duplex filter. As duplex filters suffer a significant front-end power loss, the use of half-duplex (HD) operation also leads to a gain in terms of UE power consumption—this is especially true for high output powers.

The scheduling of half-duplex UEs in systems such as LTE and GSM are illustrated in FIG. 1. The base station (or eNodeB) 110 operates in a full duplex mode. The eNodeB can transmit and receive simultaneously as illustrated in FIG. 1. The UEs 120, on the other hand, operate in a half duplex mode. That is, UEs 120 can either receive or transmit but cannot perform both functions simultaneously as illustrated in FIG. 1. Depending on the standard, the allocation of subframes (or time slots) for uplink (UL) or downlink (DL) at the UE can be allocated in a more or less dynamic manner. In GSM, the uplink-downlink allocation is relatively fixed while in LTE, the allocation is dynamic as described further below.

The time-domain structure in LTE transmissions (both uplink and downlink) is made up of subframes that are each one millisecond (1 ms) in duration. For each subframe, a scheduler in the eNodeB controls which UEs should receive data in the downlink and/or transmit data in the uplink. Multiple UEs can be addressed in the same subframe. This could be accomplished by using, for example, separate parts of the frequency spectrum for transmission.

In frequency division duplexing (FDD), separate channels are utilized for uplink and downlink. Uplink is transmission from a UE (or terminal) to eNodeB (or base station) such as from UE 120 to eNodeB 110 in FIG. 1. Downlink is reception by UE from eNodeB such as by UE 120 from eNodeB 110 in FIG. 1.

In full-duplex FDD (frequency division duplexing), a UE can both transmit and receive in a given subframe (i.e. simultaneously). In half-duplex operation, a UE can only transmit or receive but cannot transmit and receive simultaneously. In LTE, half-duplex FDD is implemented as a scheduler constraint. It is up to the scheduler (in eNodeB) to ensure that a single UE is not scheduled simultaneously (from a time point of view) in uplink and downlink. Therefore, from a UE perspective, subframes are dynamically used for uplink or downlink.

For half-duplex FDD in LTE, a UE receives in the downlink unless it is transmitting in the uplink. In other words, unless a UE is transmitting, it is in a receiving mode. The UE can transmit, among other things, the following: data, hybrid-Automatic Repeat reQuest (hybrid ARQ or HARQ) acknowledgements triggered by a downlink transmission, channel-quality reports (CQI), scheduling requests (SRs) or random access attempts (RACH) for example.

An example of half-duplex operation in LTE as seen from a UE perspective is illustrated in FIG. 2. In subframe 201, the UE is explicitly scheduled in the uplink. Therefore, the UE cannot receive data in the downlink in the same subframe (i.e. subframe 201). The uplink transmission implies (or, can result in) the reception of a hybrid-ARQ acknowledgement or an ACK/NACK from eNodeB for a packet received from the UE in the downlink four subframes later for example (i.e. subframe 205 for example). As a result, the UE cannot be scheduled in the uplink in this subframe (since a HARQ is sent from eNodeB in subframe 205 and received by the UE in the downlink).

Similarly, when the UE is scheduled to receive data in the downlink in subframe 207, a hybrid-ARQ (HARQ) acknowledgement needs to be transmitted in uplink subframe 211, preventing downlink reception in this subframe (i.e. 211).

The scheduler can exploit this scheme by scheduling downlink data in four consecutive subframes and uplink transmission in the four next subframes (when the UE needs to transmit hybrid-ARQ acknowledgements) and so on. A HARQ is always sent 4 ms after a data packet. If the UE transmits UL data and a HARQ on a 4 ms old downlink data simultaneously, the information is multiplexed together in an uplink transmission that includes both HARQ and data. Consequentially, at most half of the time can be used in the downlink and half in the uplink. This may be better described as the asymmetry in half-duplex FDD being 4:4.

In order to facilitate scheduling in the LTE uplink, the UE should have the ability to request uplink resources from eNodeB for data transmission (from UE to eNodeB). This is addressed by allowing the UE to transmit a scheduling request (SR) at certain time instants. The SR and RACH time instances and periodicities are sent by eNodeB. The periodicity (5 or 10 or 40 ms for example) is the frequency; the time instant is similar to a phase that specifies which subframe should be used by the UE for a transmission.

Upon detection of an SR from a given UE, the scheduler can allocate resources to the UE (for data transmission). For providing connection to a cell, LTE (as any cellular system) has a mechanism for the UE to perform a random access (RACH) in certain subframes. RACH instants are muxed (multiplexed) together with data, i.e. during some UL subframes some parts of the frequency bandwidth is allocated to RACH signals. The same holds for SR. Upon reception of the random access request, eNodeB initiates a procedure where the UE identifies itself and connects to the cell. As long as the UE does not have a good uplink (UL) time synchronization, a request should be made by a RACH (if no UL requests have been made during the last 10-30 seconds for example). If the UL time synchronization is known (UL transmissions have occurred less than 10 seconds earlier for example), the SR should be used.

As described, half-duplex provides certain advantages such as in cost and in size. It does also have a drawback in that its maximum allowed throughput is reduced due to not having the possibility of allocating all subframes to UL and/or DL. However, for LTE and future cellular systems supporting data rates up to and above 100 MB/s, half-duplex terminals still can reach high data rates (such as data rates >>20 Mb/s for example). This is sufficient in many cases especially when the reduced cost of an HD UE is taken into account.

There is an inherent problem in using HD UEs in full duplex systems like LTE due to the random nature of scheduling requests and random access by the terminal (or, UE). As described above, the uplink retransmissions of data (from UE to eNodeB) and/or hybrid-ARQ acknowledgements related to downlink transmissions (from eNodeB to the UE) are explicitly controlled by the scheduler (in eNodeB). Random access and scheduling requests, on the other hand, are initiated autonomously by the UE.

The eNodeB does not know in advance if any of RACH or SR will be present. Therefore, there is a risk or a possibility of a DL packet being transmitted by eNodeB to the UE at the same time as the RACH and/or SR from the HD UE is received by eNodeB. However, each is UE is allocated a RACH and SR transmission (and also CQI reporting) pattern via higher layer signalling. Therefore, possible RACH, CQI reports and SR instants are known to eNodeB. By properly configuring DL allocations to HD UEs, DL (download) packets could in principle be avoided at the subframes allocated to the UL (upload) instants.

RACH and SR might occur on a relatively infrequent basis. By avoiding DL allocation every 2-20 ms for example (when RACH/SR is allowed for that particular HD UE), the UL and DL collisions at the UE can be avoided.

If a RACH/SR occurs at a rate of every 100 ms or even more seldom, it is a significant waste of resources to forbid DL transmissions every 5 or 20 ms for example. That is, for collisions that might happen on a 100 ms to several second basis, avoiding DL transmissions every 5 or 10 or 20 ms for example, is a significant waste of DL resources. In a typical scheduler implementation, such waste of DL resources is not tolerated. The collision of DL data with SR or RACH will be handled by HARQ (Hybrid automatic repeat request) or higher layer transmissions. This, however, has a negative impact on the HD terminal throughput.

A need exists, therefore, for half duplex UEs to take into account the problem of SR/RACH collision with DL data.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, systems, and apparatuses for avoiding collisions between uplink and downlink data of user equipment.

In some but not all embodiments, a method of avoiding collision between uplink and downlink data of a user equipment comprises: verifying existence of data in an uplink buffer, determining a time instant for transmission of the uplink data, determining a likelihood for reception of downlink data at the determined time instant and selectively transmitting the uplink data based on the likelihood of reception.

In alternative ones of some but not necessarily all embodiments, a method of avoiding collision between uplink and downlink data of a user equipment comprises: verifying existence of data in an uplink buffer, determining a time instant for transmission of the uplink data, determining a likelihood for reception of downlink data at the determined time instant, computing a collision score based on the likelihood and received periodicity information and selectively transmitting the uplink data based on the collision score.

In other alternative ones of some but not necessarily all embodiments, a user equipment comprises: a transceiver to communicate data, memory for storing uplink data and a processor to detect presence of uplink data in the memory, determine a time instant for transmitting the uplink data, determine likelihood of receiving downlink data at the time instant, and selectively instruct the transceiver to transmit the uplink data based on the likelihood.

BRIEF DESCRIPTION OF THE DRAWINGS

The several features, objects, and advantages of Applicants' invention will be understood by reading this description in conjunction with the drawings, in which.

DETAILED DESCRIPTION

Figure 1:
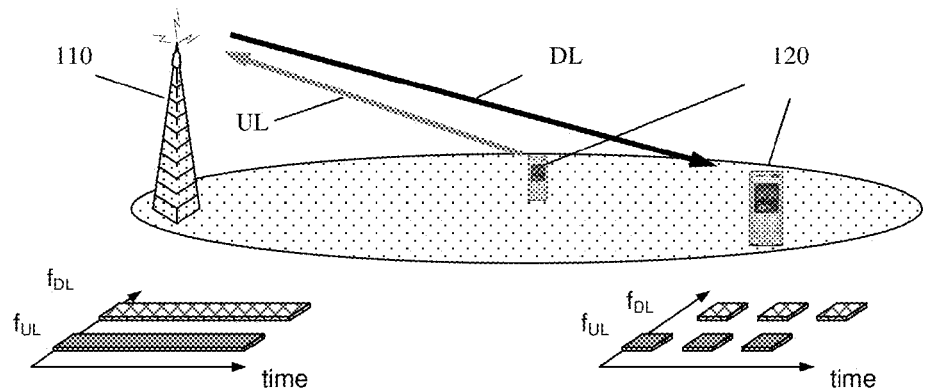
FIG. 1 illustrates the scheduling of half-duplexing user equipment.
Figure 2:
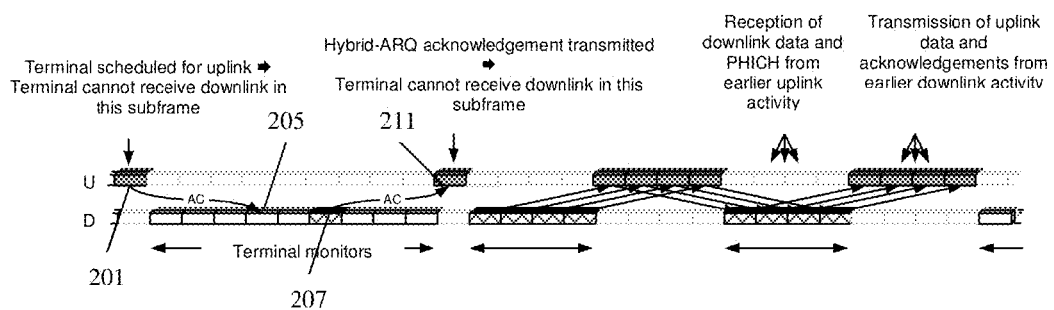
FIG. 2 illustrates half-duplex operation in LTE from a UE perspective.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

The following description of the implementations consistent with the present invention refers to the accompanying drawings. The same reference numbers in different drawings identify the same or similar elements. The following detailed description does not limit the invention. Instead, the scope of the invention is defined by the appended claims.

A terminal (or, UE) may trigger the SR or RACH based on whether there is data in a transmit buffer. The UE may determine the likelihood of receiving a DL packet at the time (i.e. in the same subframe) of transmitting the SR (or RACH). This determination can be made by the UE prior to transmitting an SR (or RACH). Typically, the UE receives data in a bursty fashion. That is, if data has been received in subframes just prior to a time the terminal is allowed to transmit a SR, there is a high likelihood of also receiving a data packet at that time.

Hence, there is a high risk of collision between the SR/RACH and DL data. In such cases, the UE can wait to transmit the SR until the next allowable subframe.

In addition, a collision score can be determined that also takes into account the SR periodicity. The periodicity may be specified by the eNodeB. If the higher layer signalling has assigned a small SR periodicity (below 5-10 ms for example), the latency in waiting to transmit SR/RACH is not significant. In this situation, the likelihood (of receiving packets in the downlink) threshold for determining whether to transmit or wait on SR/RACH can be set at a relatively low level. Even if the likelihood of receiving packets is relatively small (30% for example), the terminal can wait to transmit the SR/RACH (due to the relatively small latency). That is, unless the likelihood of receiving data in the downlink is less than 30%, the terminal will wait to transmit the SR/RACH. If the likelihood is less than 30%, the terminal can transmit the SR/RACH and if it is greater than 30%, the terminal will wait to transmit the SR/RACH.

If the SR periodicity is longer (more than 10 ms for example), the latency in waiting to transmit SR/RACH is significant. In this situation, the likelihood can be increased to a much higher value (such as 70% for example). That is, unless the likelihood of receiving data in a downlink is greater than 70%, the SR/RACH may be transmitted. If the likelihood is greater than 70%, the terminal can wait to transmit the SR/RACH; if it is less than 70%, the terminal can transmit the SR/RACH.

The likelihood of DL reception at an instant in time, t given data at time instant t−1 (or at an instant in time t+1 given data at time instant t) can easily be estimated based on earlier received packets. The percentage values identified above are purely exemplary and while only the terms "greater" and "less than" have been recited, each or one of these ("greater" and "less than") can also include "equal to".

According to exemplary embodiments, the terminal itself can reduce the risk of collisions between SR colliding with DL packet and improving throughput and system performance for half duplex (HD) terminals (user equipment) in LTE.

Figure 3:
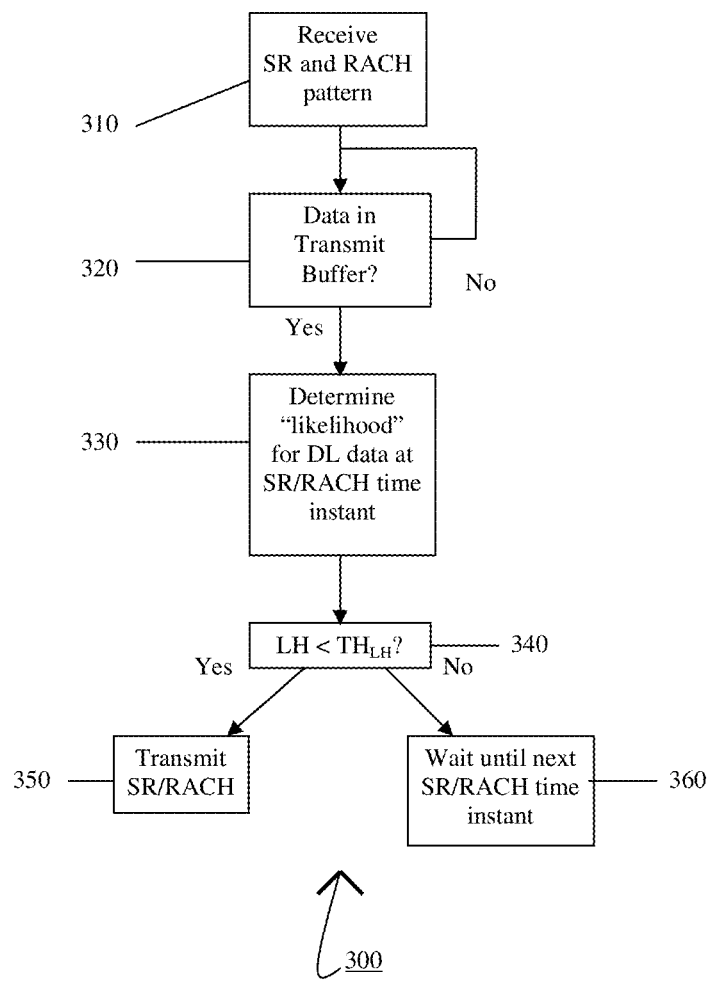
FIGS. 3 and 4 illustrate methods in accordance with exemplary embodiments.

A method in accordance with an exemplary embodiment is illustrated in FIG. 3. A terminal (UE) may receive, via higher layer signalling, SR and RACH time instants at 310. That is, UE may receive from the base station (eNodeB), the time instants where the terminal is allowed to transmit a RACH or a Scheduling Request (SR) to the base station (eNodeB). The UE may monitor the (UL) transmit data buffer at 320. If the transmit buffer contains data, a control unit may determine the likelihood (a % value for example) of reception of DL data at the same time instant as that for SR/RACH transmission at 330.

A pre-determined threshold value (for the likelihood) may also be set or specified by the UE. This likelihood (LH) value may be compared with the threshold value ($TH_{LH}$) at 340 to determine whether or not to transmit the data in the buffer.

If the comparison results in the likelihood value (of receiving a DL packet) being less than the threshold value, the SR/RACH data may be transmitted at 350. Otherwise, (i.e. if the likelihood value is equal to or greater than the threshold value), the SR/RACH may wait until the next SR/RACH time instant for transmission at 360. The likelihood of reception at a certain time t+n given reception at time t can easily be determined from earlier received data (looking at past patterns or historical data for example).

Figure 4:
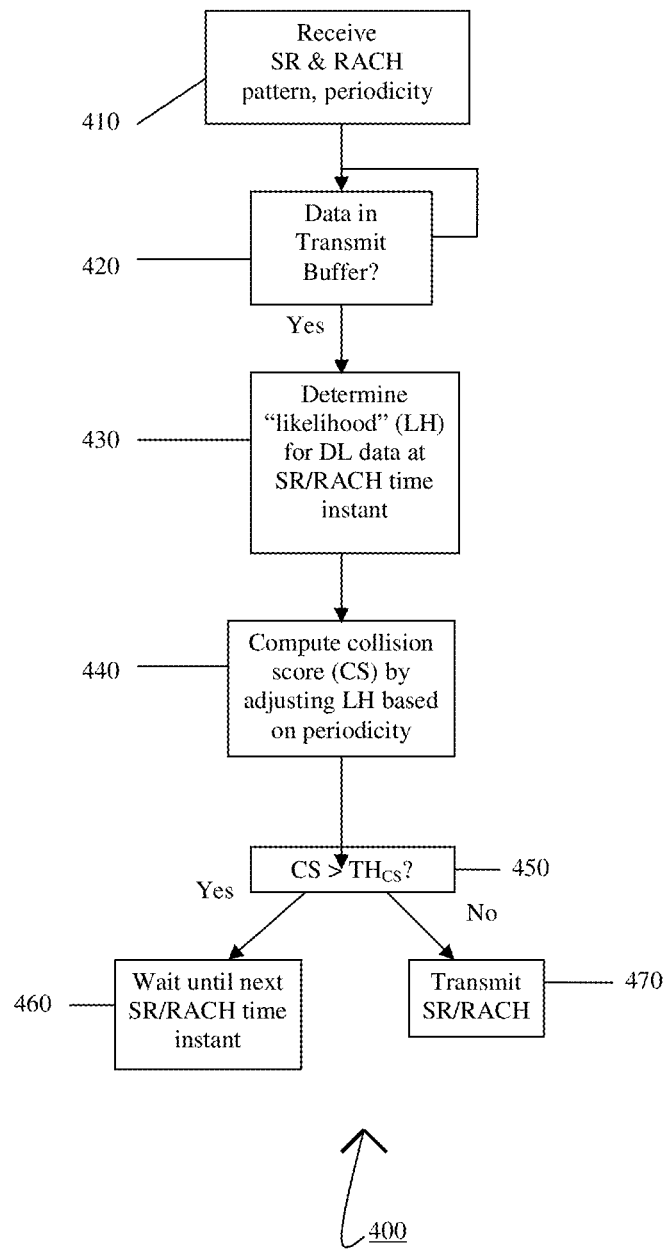

A method in accordance with additional exemplary embodiments is illustrated in FIG. 4. A terminal (UE) may receive, via higher layer signalling, SR and RACH time instants and periodicity information at 410. That is, UE may receive from the base station (eNodeB), the time instants where the terminal is allowed to transmit a RACH or a Scheduling Request (SR) to the base station (eNodeB). The UE may monitor the (UL) transmit data buffer at 420. If the transmit buffer contains data, a control unit may determine the likelihood of reception of DL data at the same time instant as that for SR/RACH transmission at 430. The likelihood of reception may be a percentage value for example.

A collision score may be computed at 440 (on a scale of 1 to 10 for example) taking into consideration the RACH and SR periodicity and the likelihood (determined at 430) of reception of DL data. As described above, a delay in SR and RACH transmission may be tolerated if the periodicity is low due to the relatively short latency. If the delay leads to higher latency, then the SR and RACH data is transmitted.

A pre-determined threshold value (for the collision in this case) may also be set by the UE. This collision score (CS) may be compared with the collision threshold value ($TH_{CS}$) at 450 to determine whether or not to transmit the data in the buffer.

If the collision score (CS) is lower than the collision threshold (lower than a threshold), the SR/RACH may wait until the next SR/RACH time instant for transmission 460. Otherwise (i.e. if the collision score is higher or equal to the threshold), the SR/RACH data may be transmitted at 470.

In the embodiment described with reference to FIG. 3, the likelihood of DL reception during SR/RACH transmission is considered. In the embodiment described with reference to FIG. 4, the likelihood is considered along with the periodicity to compute a collision score. The threshold in this embodiment (i.e. described with reference to FIG. 4) may be adjusted based on the periodicity with the threshold being increased if the periodicity is low and decreased if the periodicity is high.

Figure 5:
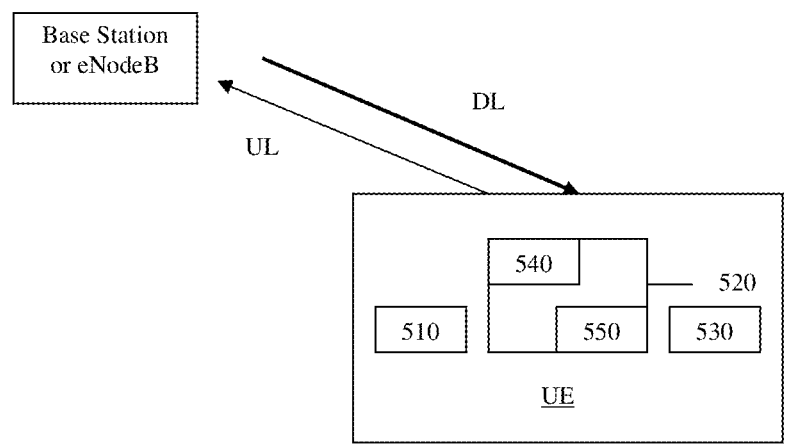
FIG. 5 illustrates a user equipment according to exemplary embodiments.

A user equipment such as a mobile computing device may selectively transmit uplink data in exemplary embodiments. A user equipment 500 is illustrated in FIG. 5. Such a user equipment may be a mobile telephone or a portable computing device for example. User equipment 500 may operate in a half-duplex (HD) mode.

The user equipment 500 may include, inter alia, circuitry such as a transceiver 510, memory 520 and processor 530. In one embodiment, in order for the processor 530 to be able to perform the steps illustrated in FIGS. 3 and 4, the memory 520 comprises a computer program 540 with computer program modules which when run by the processor 530 causes the mobile communication device to perform all or some of the steps illustrated in FIGS. 3 and 4. The memory may for example be a flash memory, a RAM (Random-access memory) ROM (Read-Only Memory) or an EEPROM (Electrically Erasable Programmable ROM), and the computer program modules described above could in alternative embodiments be distributed on additional memories (not shown) in the user equipment 500. The processor may not only be a single CPU (Central processing unit), but could comprise two or more processing units in user equipment 500. For example, the processor may include general purpose microprocessors, instruction set processors and/or related chips sets and/or special purpose microprocessors such as ASICs (Application Specific Integrated Circuit). The processor may also comprise board memory for caching purposes.

A transmit data buffer 550 may also be included (within memory 520 for example) along with an antenna (not illustrated). UE 500 may communicate with a base station or eNodeB (not specifically illustrated) via the transceiver 510. UE 500 may receive SR and RACH time instants as well as the periodicity data from eNodeB.

While the description has focused on cases with scheduling request (SR) and RACH signalling, exemplary embodiments are not limited only to such signalling. It may be applicable where UL signalling takes place without knowledge of such signalling by the base station leading to collision(s) between uplink (UL) and downlink (DL) data packets.

It will be appreciated that the procedures (arrangement) described above may be carried out repetitively as necessary. To facilitate understanding, many aspects of the invention are described in terms of sequences of actions. Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The invention has been described with reference to particular embodiments. However, it will be readily apparent to those skilled in the art that it is possible to embody the invention in specific forms other than those of the embodiment(s) described above. The described embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of avoiding collision between uplink and downlink data of a user equipment, comprising:
   verifying existence of the uplink data in an uplink buffer;
   determining a time instant for transmission of the uplink data in the uplink buffer;
   determining a likelihood for reception of the downlink data at the determined time instant; and
   selectively transmitting the uplink data in the uplink buffer based on the likelihood of reception wherein the user equipment is a half duplex (HD) equipment and the time instant is determined from a received scheduling request (SR) and random access channel (RACH) pattern.

2. The method of claim 1, further comprising:
   transmitting the uplink data in the uplink buffer if the likelihood is less than a pre-specified likelihood threshold value.

3. The method of claim 2, further comprising:
   withholding transmission of the uplink data in the uplink buffer if the likelihood is greater than or equal to the threshold value.

4. The method of claim 3, further comprising:
   transmitting the uplink data in the uplink buffer in a next allowable time slot.

5. The method of claim 1, further comprising:
   receiving the downlink data from a base station.

6. The method of claim 1, further comprising:
   transmitting the uplink data in the uplink buffer to a base station.

7. The method of claim 1, wherein the likelihood determination is based on downlink data reception patterns.

8. A method of avoiding collision between uplink and downlink data of a user equipment, comprising:
   verifying existence of the uplink data in an uplink buffer;
   determining a time instant for transmission of the uplink data in the uplink buffer;
   determining a likelihood for reception of the downlink data at the determined time instant;
   computing a collision score based on the likelihood and received periodicity information; and
   selectively transmitting the uplink data in the uplink buffer based on the collision score wherein the user equipment is a half duplex (HD) equipment.

9. The method of claim 8, further comprising:
   transmitting the uplink data in the uplink buffer if the collision score is less than a pre-specified threshold value.

10. The method of claim 9, further comprising:
    withholding transmission of the uplink data in the uplink buffer if the collision score is greater than or equal to the threshold value.

11. The method of claim 10, further comprising:
    receiving the periodicity information from a base station.

12. The method of claim 8, further comprising:
    transmitting at least one of scheduling request (SR) and random access channel data (RACH).

13. The method of claim 12, further comprising:
    transmitting the uplink data in the uplink buffer to a base station.

14. The method of claim 8, wherein the collision score increases with increased periodicity to reduce latency.

15. A user equipment comprising:
    a transceiver to communicate uplink data;
    memory for storing the uplink data; and
    a processor to:
        detect presence of the uplink data in the memory,
        determine a time instant for transmitting the uplink data,
        determine likelihood of receiving downlink data at the time instant, and
        selectively instruct the transceiver to transmit the uplink data based on the likelihood wherein the time instant is determined from a received scheduling request (SR) and random access channel (RACH) pattern.

16. The user equipment of claim 15, wherein the processor instructs the transceiver to transmit the uplink data if the likelihood is less than a pre-specified threshold.

17. The user equipment of claim 15, wherein the processor delays transmission of the uplink data if the likelihood is greater than or equal to a pre-specified threshold.

18. The user equipment of claim 15, wherein the transceiver communicates with a base station.

19. The user equipment of claim 15, further comprising:
    circuitry configured to operate in a half duplex (HD) mode.

* * * * *